United States Patent [19]

Sugaya et al.

[11] Patent Number: 5,180,750

[45] Date of Patent: Jan. 19, 1993

[54] ANION EXCHANGER

[75] Inventors: Yoshio Sugaya; Ichiro Terada, both of Yokohama; Kiyonari Sanekata, Fujisawa; Hirofumi Horie, Yokohama, all of Japan

[73] Assignee: Asahi Glass Company Ltd., Tokyo, Japan

[21] Appl. No.: 385,229

[22] Filed: Jul. 26, 1989

[30] Foreign Application Priority Data

Jul. 29, 1988 [JP] Japan .................... 63-188187
Sep. 1, 1988 [JP] Japan .................... 63-216329
Sep. 6, 1988 [JP] Japan .................... 63-221314

[51] Int. Cl.⁵ ............................ B01J 41/00
[52] U.S. Cl. ............................ 521/32; 521/27; 521/30
[58] Field of Search ............ 521/27, 32, 30, 28

[56] References Cited

U.S. PATENT DOCUMENTS

| | | | |
|---|---|---|---|
| 3,236,808 | 2/1966 | Goldberg et al. | 525/906 |
| 3,663,507 | 5/1972 | Vogel et al. | 525/906 |
| 4,273,878 | 6/1981 | Amick | 521/32 |
| 4,577,000 | 3/1986 | Chen et al. | 525/534 |
| 4,654,410 | 3/1987 | Kashiwame et al. | 521/32 |

OTHER PUBLICATIONS

Chem. Abstracts vol. 109, entry 7656w.
Journal of Membrane Science 22 (1985) 325-332.

Primary Examiner—Thurman K. Page
Assistant Examiner—Peter F. Kulkosky
Attorney, Agent, or Firm—Oblon, Spivak, McClelland, Maier & Neustadt

[57] ABSTRACT

An anion exchanger consisting essentially of an aromatic polysulfone block copolymer of the formula:

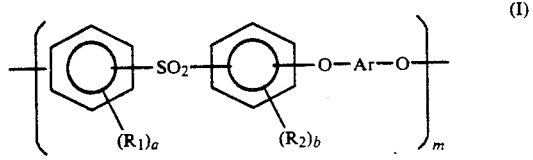

(I)

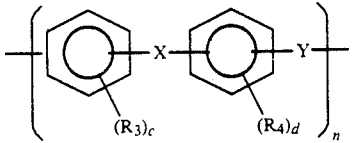

wherein Ar is

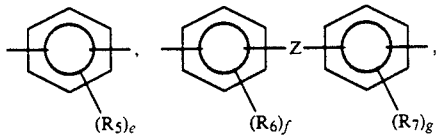

or

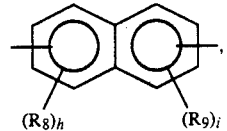

X is $-SO_2-$,

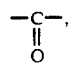

$-S-$ or $-O-$,

Y is $-SO_2-$, $-S-$ or $-O-$, Z is a single bond, $-O-$, $-S-$, $-SO_2-$,

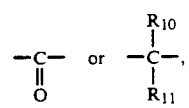

each of $R_1$ to $R_9$ which may be the same or different is a hydrocarbon group having from 1 to 8 carbon atoms, each of a to d is an integer of from 0 to 4, e is an integer of from 0 to 3, (f+g) is from 0 to 7, (h+i) is from 0 to 5, each of $R_{10}$ and $R_{11}$ is a hydrogen atom or a hydrocarbon group having from 1 to 6 carbon atoms, and each of m and n is an integer of from 2 to 200, provided m/n=100/1-1/10, and having anion exchange groups introduced to the aromatic rings of the copolymer.

25 Claims, 1 Drawing Sheet

ANION EXCHANGER

The present invention relates to an anion exchanger capable of adsorbing or permselectively separating a certain component from a fluid mixture. More particularly, it relates to an anion exchanger having excellent workability, which is useful, for example, as an anion exchange membrane having excellent ion permselectivity (selective ion permeability), a low electric resistance and excellent mechanical properties such as handling efficiency and dimensional stability, useful for electrodialysis for concentrating sea water, for diffusion dialysis of an acid or as a separator for electrolytic cells, as a hollow fiber-type anion exchange membrane useful for dialysis, or as a porous anion exchange membrane providing good permeability for high molecular anions.

A system for permselectively separating a certain component from a liquid mixture by means of an ion exchange membrane, is already employed in a wide range of fields. Among anion exchangers reported in many literatures and patent documents, anion exchangers of aminated (or quaternary pyridinium-modified) products of chloromethylated styrene (or vinylpyridine)-divinyl-benzene copolymers, may be mentioned as the most practical and useful anion exchangers. These anion exchangers have been developed and various fields of applications by virtue of their chemical resistance, heat resistance and ion exchangeability and their adaptability such that their ion exchange properties and selective permeability can be controlled by changing the content of the diviynylbenzene as the cross-linking agent.

However, an anion exchange membrane having a super low resistance is required in new applications, for example, for concentrating sea water to produce sodium chloride as inexpensively as industrial salt, or as a separator for electric cells. Further, in the field of diffusion dialysis, an anion exchange membrane having excellent permselectivity for phosphoric acid is required, for example, in the treatment of the phosphoric acid waste solution discharged from an aluminum plant. In an inexpensive acid recovery system by means of an anion exchange membrane having excellent permselectivity for an acid, a membrane having a low resistance and an improved recovery rate of an acid is required with a view to environmental protection. However, the conventional styrene-divinylbenzene copolymer membrane can not satisfy these requirements. Namely, in order to reduce the resistance, it is necessary to reduce the thickness of the membrane. However, the styrene-divinylbenzene has a difficulty in the mechanical strength, particularly in brittleness, and it is thereby impossible to obtain an ion exchange membrane having a thickness of less than 100 μm. Further, the styrene-divinylbenzene type resin is poor not only in the mechanical properties but also in the workability and thus has a drawback that it is thereby difficult to obtain a fabricated membrane such as a hollow fiber membrane or a porous ion exchange membrane.

On the other hand, an engineering plastic having excellent workability and mechanical strength is used as a separating membrane such as an ultrafiltration membrane, a reverse osmosis membrane or a gas separation membrane. In particular, a polysulfone membrane having excellent chemical resistance has been studied for its application as an ion exchange membrane by improving the permeability for ultrafiltration or reverse osmosis or imparting ion permselectivity by introducing ion exchange groups into the membrane.

For example, U.S. Pat. No. 3,709,841 discloses a sulfonated product of a polysulfone having a repeating unit of the formula:

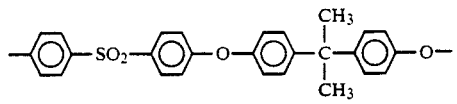

Further, Japanese Unexamined Patent Publications No. 99973/1975, No. 146379/1976 and No. 4505/1986 disclose an ultrafiltration or reverse osmosis membrane having such a sulfonated polysulfone laminated on an anisotropic ultrafilter.

Furthermore, J. Membrane Science, Vol. 22, (1985), pages 325-332 discloses a cation exchange membrane or anion exchange membrane prepared from the above-mentioned sulfonated polymer or chloromethylated polymer of polysulfone.

However, these polysulfone ion exchange membranes are not cross-linked. If it is attempted to increase the ion exchange capacity and to reduce the resistance, the water absorptivity sharply increases, leading to a decrease of the fixed ion concentration and a sharp decrease of the ion permselectivity. On the other hand, if it is attempted to increase the ion selectivity, the resistance sharply increases. As a means to overcome such drawbacks, J. Membrane Science, Vol. 22, (1985), pages 325-332 and DE3143804 propose an asymmetric double layered membrane comprising an ion permselective dense layer having a thickness of a few tens μm and an ion exchange porous layer thicker than the dense layer.

However, such a polysulfone ion exchange membrane having an asymmetric structure is likely to undergo a dimensional change during flocculation and tends to have defects, and as the ion exchange capacity increases, the affinity to water increases, whereby it tends to hardly flocculate so that it tends to be difficult to obtain a membrane having sufficient mechanical strength, and the dimensional stability tends to be poor. For the purpose of overcoming such drawbacks, a composite anion exchange membrane has been developed which has an anion exchange polysulfone of a few μm coated on a dimension stable and chemically stable non-swellable porous polysulfone supporting membrane (Fibers and Industry, Vol. 44, No. 1, p. 18). However, such a composite anion exchange membrane is inferior in the film properties to the conventional styrene-divinylbenzene anion exchange membrane, and can not be a substitute for the conventional membrane.

It is an object of the present invention to overcome the above mentioned drawbacks of the conventional techniques and to provide an anion exchanger, particularly of a membrane form (which may be referred to hereinafter as an anion exchange membrane), having excellent ion permselectivity, a low resistance and excellent dimensional stability and handling efficiency.

Another object of the present invention is to provide an anion exchanger, particularly of a membrane form, useful for electrodialysis, for a separator of electrolytic cells, or for diffusion dialysis of an acid, an not be attained by the conventional techniques. According to the present invention, the above objects can be attained by an anion exchanger consisting essentially of an aromatic polysulfone block copolymer of the formula:

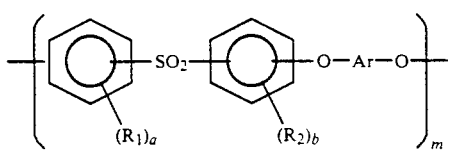

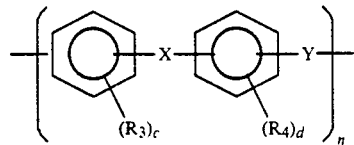

wherein Ar is

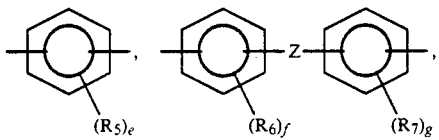

,
or

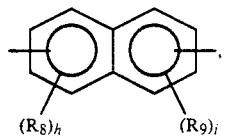

, X is —SO$_2$—,

, —S—, or —O—, Y is —SO$_2$—,

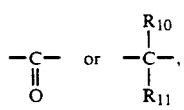

,
each of R$_1$ to R$_9$ which may be the same or different is a hydrocarbon group having from 1 to 8 carbon atoms, each of a to d is an integer of from 0 to 4, e is an integer of from 0 to 3, (f +g) is from 0 to 7, (h +i) is from 0 to 5, each of R$_{10}$ and R$_{11}$ is a hydrogen atom or a hydrocarbon group having from 1 to 6 carbon atoms, and each of m and n is an integer of from 2 to 200, provided m/n = 100/1 -1/10, and having anion exchange groups introduced to the aromatic rings of the copolymer.

The anion exchanger of the present invention consists basically of a block copolymer of the polysulfone having the specific Ar units and the polysulfone having the X and Y units, as the backbone. This is based on a novel concept and discovery, whereby it is possible to present an anion exchanger having excellent properties far superior to conventional anion exchangers.

Namely, conventional polysulfone anion exchangers comprise a cationic polymer having repeating units represented by the formula:

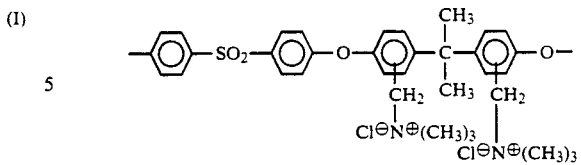

as disclosed in J. Membrane Sci., Vol. 22, (1985), pages 325-332. If the ion exchange capacity exceeds 1.5 meq/g dry resin, the water absorptivity tends to be substantial, thus leading to a deterioration of the ion selectivity. On the other hand, if the ion exchange capacity is less than 1.1 meq/g dry resin, the water absorptivity is small, and the increase of the resistance tends to be substantial.

The present inventors have conducted extensive researches on polysulfone anion exchangers and have found that by using a block copolymer having segments to which ion exchange groups can readily be introduced and segments to which ion exchange groups can hardly be introduced, it is possible to control the ion exchange capacity and to obtain an anion exchanger having excellent ion permselectivity and excellent mechanical properties and moldability. The present invention has been accomplished on the basis of this discovery.

Now, the present invention will be described in detail with reference to the preferred embodiments.

BRIEF DESCRIPTION OF THE DRAWING

In the accompanying drawing.

Figure 1:
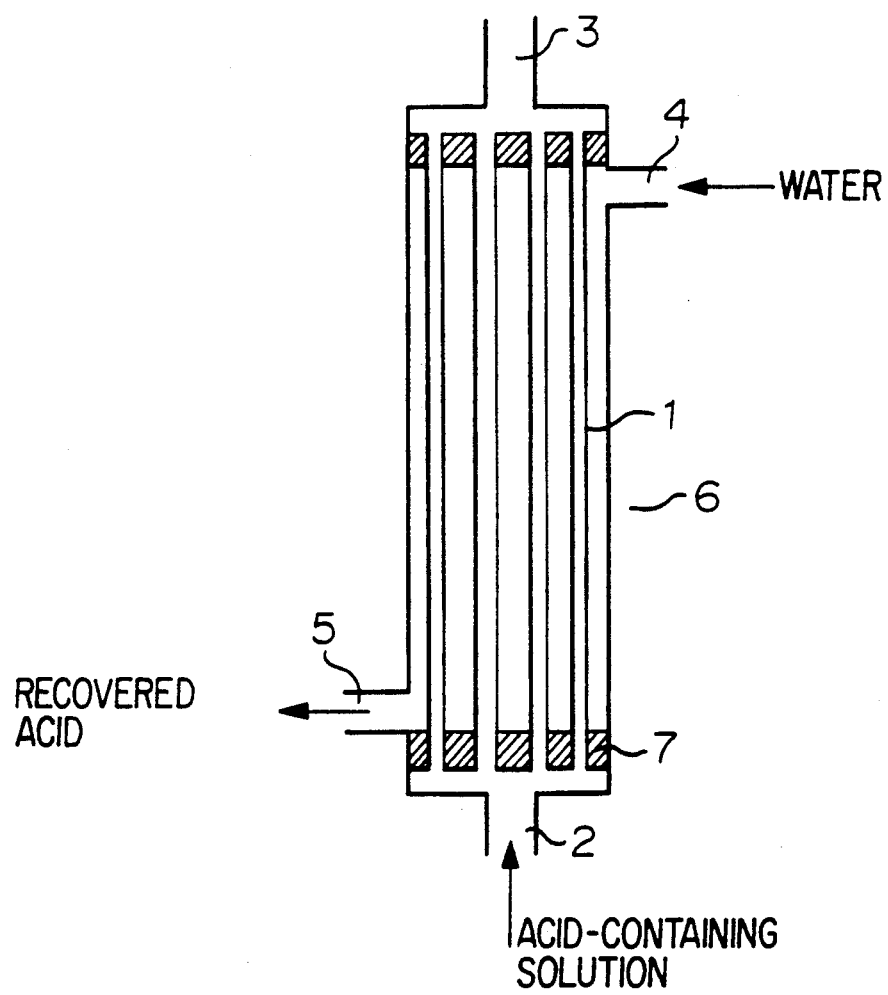
FIG. 1 is a diagrammatical cross-sectional view of an acid recovery apparatus used in the present invention, wherein reference numeral 1 indicates a hollow fiber-type anion exchange membrane, numeral 2 indicates an inlet for the solution to be treated, numeral 3 indicates an outlet of the treated solution, numeral 4 indicates an inlet for a dialyzate solution, numeral 5 indicates an outlet of the dialyzate solution (recovered solution), numeral 6 indicates a dialytic apparatus and numeral 7 indicates a partition wall.

The anion exchanger of the present invention consists essentially of the aromatic polysulfone block copolymer of the formula I. As such a polysulfone block copolymer, it is possible to employ a block copolymer comprising polysulfone having Ar units, preferably,

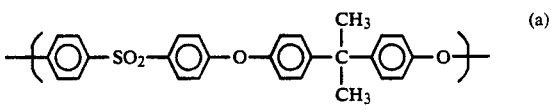   (a)

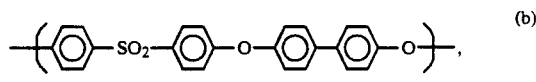   (b)

or,

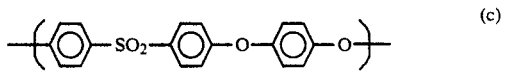   (c)

and different polysulfone having X and Y units, preferably,

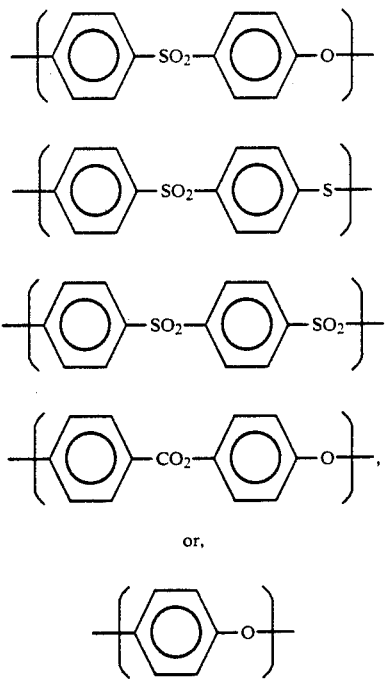

According to the present invention, by using the polysulfone block copolymer, it is possible to obtain an anion exchanger having a high performance which has not been attainable by conventional anion exchangers. Particularly, the anion exchanger of the present invention is superior in that the ion exchange capacity can readily be controlled, and the resulting anion exchanger is excellent in the permselectivity, the mechanical properties and the chemical resistance.

It has not yet been clearly understood why the block copolymer of the present invention is so excellent as an ion exchange membrane. However, the reason may be explained as follows.

Namely, the ion permeability (membrane resistance) is higher as the water absorptivity of the membrane becomes high, and the ion permselectivity (transport number, current efficiency) is higher as the fixed ion concentration in the membrane (amount of ion exchange groups per the water content in the membrane) becomes high. Therefore, in order to obtain an ion exchanger having excellent ion permselectivity, it is necessary to increase the ion exchange capacity and to prevent the increase of the water absorptivity to prevent a decrease of the fixed ion concentration. In the conventional styrene ion exchange resin, it is common to employ a method of cross-linking with divinylbenzene to prevent the increase of the water absorptivity. However, the increase of ion exchange groups and the corresponding increase of the cross-linking agent tend to lead to brittleness of the resin. Therefore, there is a limit at a certain level from the viewpoint of the balance between the ion permselectivity and the mechanical strength.

In a case of an anion exchanger made of a polysulfone homopolymer, when the ion exchange capacity is small, water is hardly introduced to the ion exchange groups due to the cohesive force of the polysulfone backbone, whereby the membrane resistance is high, and when the ion exchange capacity exceeds a certain level, the effect for suppressing the water absorptivity of the ion exchange groups due to the cohesive force of the polysulfone backbone is lost, whereupon the water absorptivity rapidly increases, and the fixed ion concentration decreases, thus leading to deterioration of the ion permselectivity and the mechanical properties.

Whereas, in the case of a polysulfone block copolymer, ion exchange groups are distributed in a high density at the segments to which ion exchange groups can readily be introduced. Therefore, even when the ion exchange capacity is relatively low, water is adequately introduced to the ion exchange groups, whereby the membrane resistance is low as compared with the homopolymer. On the other hand, even when the ion exchange capacity is made high, the cohesive force among the segments to which ion exchange groups are hardly introduced, provides a pseudo-crosslinking function and suppresses an abrupt increase of the water absorptivity, whereby the fixed ion concentration does not decrease, the ion permselectivity can be maintained at a high level, and the mechanical strength scarcely deteriorates.

In the formula I for the polysulfone block copolymer of the present invention, if the ratio of the number m of segments containing Ar to which chloromethyl groups can readily be introduced to the number n of segments containing X and Y to which chloromethyl groups can hardly be introduced, is more than 100/1, the pseudo-crosslinking effect due to the cohesive force of the segments containing X and Y, decreases, thus leading to deterioration of the ion permselectivity due to a decrease of the fixed ion concentration. On the other hand, if the ratio is less than 1/10, the ion exchange capacity will not be large, whereby the membrane resistance tends to increase. It is preferred to employ $m/n = 10/1-2/10$.

Further, each of m and n is from 2 to 200. In the case of an alternating copolymer wherein m or $n = 1$, the length of each segment is too short that no adequate function of each segment will be provided, and a copolymer having a high molecular weight can not thereby be obtained, whereby the mechanical strength will be inadequate. Preferably, a block copolymer having an intrinsic viscosity of at least 0.3 is used.

Particularly, an aromatic polysulfone/polythioether sulfone copolymer of the formula I wherein X is $-SO_2-$, and Y is $-S-$ is preferably employed, since a copolymer having a high molecular weight can be obtained, and the control of the copolymer composition can easily be performed, as well as from the viewpoint of the moldability, the mechanical strength and the chemical resistance. Such a copolymer can be prepared by the process disclosed in U.S. Pat. No. 4,654,410 by the present applicants.

For introducing ion exchange groups to such a polymer, it is possible, for example, to employ (a) a method wherein aminomethyl groups are introduced and, if necessary, converted to quaternary ammonium salts with a halogenated alkyl, or (b) a method wherein haloalkyl groups are introduced, followed by amination with $NH_3$ or with a primary to tertiary amine. The haloalkylationamination of method (b) is preferably employed, since the reaction is easy, and it is thereby possible to obtain anion exchange membranes with different membrane properties.

The haloalkyl groups include, for example, $-(CH_2)_nCl$, $-(CH_2)_nBr$, $-(CH_2)_nI$, and $-(CH_2)_nF$, wherein n is from 1 to 5, preferably 1 to 3. From the viewpoint of the reactivity, —CH$_2$Cl and —CH$_2$Br are preferred. From the viewpoint of the mass productivity, a chloromethyl group is preferably employed. For example, such groups may be introduced by contacting a polymer containing an aromatic polysulfone with chloromethylmethylether, 1,4-bis(chloromethoxy)butane, 1-chloromethoxy-4-chlorobutane or a nucleophilic chloromethylation agent such as formalin-hydrochloride or paraformaldehyde-hydrochloride in the presence of a catalyst mentioned later.

As a method for introducing —CH$_2$Cl groups to the polysulfone polymer, it is possible to employ a method wherein the above-mentioned chloromethylation agent is contacted with granular polymers or a membrane-shaped polymer. However, with a view to the uniformity of the reaction and in order to obtain a polymer having excellent moldability into a thin film, it is preferred to dissolve the polysulfone polymer in a solvent which is stable against the chloromethylation agent and to conduct the reaction in a liquid state. As such solvent, a halogenated hydrocarbon such as trichloroethane or tetrachloroethane may be employed. Thus, by adding a chloromethylation agent and a catalyst such as AlCl$_3$, SbCl$_5$, FeCl$_3$, TeCl$_2$, SnCl$_4$, TiCl$_4$, TeCl$_4$, BiCl$_3$ or ZnCl$_2$ to a polysulfone polymer solution and suitably selecting the reaction temperature and the reaction time, it is possible to obtain a chloromethylated polysulfone polymer having a desired content of chloromethyl groups.

The chloromethylated polymer thus obtained, may be formed into an anion exchanger in a desired shape, preferably in accordance with the following methods:

(1) The chloromethylated copolymer is dissolved, followed by casting to form a flat film, a hollow fiber or a film supported on a porous supporting film, and then immersed in an amination solution to obtain an anion exchanger;

(2) The chloromethylated polymer is dissolved, followed by an addition of an amination agent to obtain an anion exchange resin solution, followed by casting to form a flat film, a hollow fiber or a film supported on a porous supporting film to obtain an anion exchanger.

(3) The chloromethylated copolymer is subjected to amination, and then the anion exchange resin is dissolved and molded into a desired shape.

As such a solution, a solution having a concentration of from 0.1 to 30% by weight, preferably from 1 to 20% by weight, is employed. As a solvent, a single solvent such as 1,1,2-trichloroethane, 1,1,2,2 tetrachloroethane, N,N-dimethylacetamide, N,N-dimethylformamide, dimethylsulfoxide, triethylphosphate or N-methylpyrrolidone, or a water-acetone mixture or a methanol-tetrahydrofuran mixture, may be employed.

The solution of the chloromethylated copolymer or its aminated copolymer thus obtained, is then cast into a suitable shape, and then the solvent is removed. When the removal of the solvent is conducted by heat treatment, it is usually possible to obtain a molded product having a dense structure. Otherwise, by immersing it in a solution capable of extracting the solvent, particularly preferably in a solution by means of a non solvent for the polymer, in a state where the solvent still remains, it is possible to obtain an asymmetrical anion exchange membrane having an extremely thin dense layer on the surface and a porous layer in the interior.

The optimum content of chloromethyl groups in the chloromethylated polysulfone copolymer differs depending upon the type of the amination agent in the subsequent step or the particular purpose of use as an anion exchanger. However, the content is usually selected so that the ion exchange capacity will be from 0.5 to 4.5 meq/g dry resin, preferably from 1.0 to 3.5 meq/g dry resin.

The ion exchange capacity can be controlled by suitably selecting the reaction conditions for the above-mentioned chloromethylation, or by changing the block copolymerization ratio of the segments to which chloromethyl groups are introduced to the segments to which chloromethyl groups are not introduced. Otherwise, the ion exchange capacity may be controlled by adding a predetermined amount of an amination agent to the chloromethylated polymer solution.

It is particularly preferred to employ a method wherein a predetermined amination agent is added to the chloromethylated polymer solution to obtain a solution of an anion exchange resin having a predetermined ion exchange capacity, which is cast to obtain a membrane, since it is thereby possible to obtain a variety of ion exchange membranes having different ion exchange capacities from the chloromethylated polymer obtained under the same reaction conditions as a single type of block copolymer, and the amination treatment after the film-formation is not required, whereby there will be no swelling during the amination reaction, the ion perm-selectivity is high, and the number of process steps is relatively small, and the method is excellent for mass production.

Thus, the anion exchanger of the present invention prepared from the polysulfone block copolymer has a high ion exchange capacity and high ion selectivity and mechanical strength in spite of the fact it does not have a cross-linking structure. However, in some cases, a cross linking structure may be introduced for the purpose of improving the chemical resistance or controlling the film properties.

Such a cross-linking structure may be introduced by employing a method wherein cross-linking is conducted in the presence of a Friedel-Craft catalyst by utilizing the chloromethyl groups, or a method wherein cross-linking is conducted with a compound having at least two functional groups reactive with chloromethyl groups. Such introduction of a cross-linking structure exhibits a certain effect even in the case of a conventional polysulfone homopolymer, but the film properties can remarkably be improved particularly when applied to the block copolymer of the present invention. The Friedel-Craft catalyst to be used for the introduction of such a cross-linking structure includes a Lewis acid such as AlCl$_3$, SbCl$_5$, FeCl$_3$, TeCl$_2$, SnCl$_4$, TiCl$_4$, TeCl$_4$, BiCl$_3$ or ZnCl$_2$ and a proton acid such as HF, H$_2$SO$_4$, P$_2$O$_5$ or H$_3$PO$_4$. There may be mentioned a method wherein such a Friedel-Craft catalyst is added to the chloromethylated polymer solution, followed by casting and heat treatment for cross-linking, and then, ion exchange groups are introduced by amination, or a method wherein an amination agent is added to the chloromethylated polymer so that the chloromethyl groups remain, and then the residual chloromethyl groups are cross-linked.

As the bifunctional or multi functional compound reactive with the chloromethyl groups, there may be mentioned, a polyamine, a polyalcohol such as ethylene glycol, terephthalyl alcohol, a polycarboxylic acid such as terephthalic acid, polyphenol, polymercaptan, melcaptancarboxylic acid.

Among them, a polyamine compound capable of introducing ion exchange groups and capable of crosslinking at the same time is preferred from the viewpoint of the film properties. As such a polyamine, a polyamine compound composed of a primary to secondary amine such as ethylenediamine, diethylenetriamine, triethylenetetramine, tetraethylenepentamine, polyethyleneimine or phenylenediamine, or a primary or secondary aminated compound such as N,N,N',N'-tetramethyldiaminomethane, N,N,N',N'-tetramethyl-1,2-diaminoethane, N,N,N',N' tetramethyl 1,3-diaminopropane, N,N,N',N'-tetramethyl-1,6-diaminohexane, N,N,N',N'-tetramethyldiaminodiphenylmethane, polyvinylpyridine or polychloromethylstyrene, may be employed. Among them, a diamine represented by the formula:

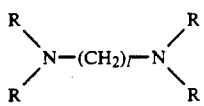

having two tertiary amines at the molecular terminals, is useful as a particularly preferred polyamine compound, since it is readily available, it has a high amination reactivity, and the membrane properties can readily be controlled by changing the number $l$ of the methylene group, wherein $l$ is from 1 to 10, preferably from 1 to 6.

The amination may be conducted by the following methods:

(1) The chloromethylated copolymer is dissolved, followed by casting to form a flat film, a hollow fiber or a film formed on a porous supporting film, followed by immersion in an amination solution to obtain an anion exchanger.

(2) The chloromethylated copolymer is dissolved, then an amination agent is added to obtain an anion exchange resin solution, which is then cast to form a flat film, a hollow fiber or a film formed on a porous supporting film, to obtain an anion exchanger.

(3) The chloromethylated copolymer is subjected to amination, and then the anion exchange resin thus formed is dissolved, followed by molding into a desired shape. When a polyamine compound is used, according to methods (2) and (3), the viscosity of the solution is likely to increase with time, gelation is likely to take place, or a solution is hardly obtainable or if obtainable, the polymer concentration tends to be extremely low at a level of not higher than a few percent. Therefore, it is usually preferred to employ method (1) for amination.

As another preferred process, a partially aminated polymer containing chloromethyl groups obtained by reacting a small amount of a monoamine to a chloromethylated polysulfone polymer, may be molded and then reacted with a polyamine.

The anion exchange membrane of the present invention may be made of a single anion exchanger. However, for an improvement of the film properties, plural anion exchangers having different fixed ion concentrations may be combined to form a multi-layered membrane, as follows:

(1) A thin layer of an anion exchanger of the present invention having a small ion exchange capacity is laminated on a thick anion exchange membrane having a large ion exchange capacity to obtain a multi-layered anion exchange membrane having improved permselectivity.

(2) A thin layer of a weakly basic anion exchanger of the present invention is laminated on a thick strongly basic anion exchange membrane having a large ion exchange capacity to obtain a multi-layered anion exchange membrane having improved permselectivity.

(3) An anion exchanger having a cross linking structure and an anion exchanger having no cross-linking structure are combined to form a multi-layered anion exchange membrane.

The above-mentioned fixed ion concentration is defined as follows:

The fixed ion concentration, $A_w$, is calculated by the following equation:

$$A_w: A_R \cdot W_2 / (W_1 - W_2)$$

where $A_R$ is an ion exchange Capacity (meq/g.dry resin), $W_1$ is the weight of membrane which is immersed in 0.5N NaCl solution at 25° C. for 16 hours, and $W_2$ is the weight of the membrane which is immersed in deionized water and dried under vacuum at 60° C.

In the present invention, such an anion exchange membrane may be used in the form of a polysulfone resin alone. However, from the viewpoint of the dimensional stability, handling efficiency and mechanical strength, it is sometimes preferred to use it as laminated with a porous membrane. Such an anion exchange membrane is a combination of a layer of the above-mentioned specific anion exchanger and a certain specific porous supporting layer, whereby the ion permselectivity is governed solely by the anion exchanger layer, and the porous layer is primarily intended for supporting and reinforcing the anion exchanger layer. In the case of an anion exchanger layer having a high electric resistance, it is intended to minimize the thickness of the anion exchanger layer so long as the ion permselectivity is attainable and to support such an anion exchanger layer on a porous layer having a low electric resistance and high mechanical strength.

In the present invention, the following two preferred embodiments may be mentioned with different types of the porous membrane.

The first composite membrane comprises a porous membrane of polyhydrocarbon olefin or polyfluoro olefin having a pore size of from 0.01 to 5 μm, preferably from 0.02 to 2 μm, a porosity of from 30 to 90%, preferably from 40 to 70%, and a thickness of from 10 to 200 μm, preferably from 25 to 150 μm, with the pore wall being hydrophilic and an anion exchanger layer having a thickness of from 0.1 to 50 μm.

For laminating an anion exchange resin on such a porous membrane, there may be employed a method wherein a polymer is melt-laminated, a method wherein a polymer solution is coated, or a method wherein a monomer is coated and then polymerized.

The porous layer which may be used in the present invention, includes a polyhydrocarbonolefin such as polyethylene, polypropylene or poly-4-methylpentene-1, and a polyfluoroolefin such as polyvinylidenefluoride, polytetrafluoroethylene, a hexafluoropropylene/tetrafluoroethylene copolymer or a fluoroolefin monomer/olefin monomer copolymer.

Various methods may be employed for the preparation of such a porous membrane. A stretch pore-forming method is preferably used to obtain a porous membrane having a small pore diameter.

However, since a porous membrane has generally a low surface free energy and a small pore diameter, it is preferred to make it hydrophilic. To make the porous membrane hydrophilic, it is possible to employ a method wherein a low molecular weight or high molecular weight substance having a hydrophilic nature is adsorbed on the porous membrane, a method wherein a low molecular weight substance is impregnated and then reacted by means of electron beams or ultraviolet rays, a method wherein the surface of the porous membrane is sulfonated by e.g. fuming sulfuric acid or chlorosulfonic acid, a method wherein the porous membrane is subjected to oxidation treatment with chromic acid, a method wherein the porous membrane is surface-treated with an excited gas or active gas such as a plasma gas or ozone gas, or a method wherein an ionic surfactant is impregnated and then treated with a polymer with a main chain having a reverse electric charge.

To the porous membrane thus obtained, a solution containing from 1 to 20% by weight of an anion exchange resin is coated. After coating the polymer solution, the laminated membrane is dried by hot air at a temperature lower than the melting point of the crystals constituting the material of the porous layer, to obtain a laminated ion exchange membrane having a low resistance. The thickness of the anion exchange membrane formed on the porous membrane made hydrophilic is preferably from 0.1 to 50 μm, more preferably from 1 to 30 μm.

If the pore wall of the porous membrane is not yet made hydrophilic, it is made hydrophilic at this stage.

By using a hollow fiber or hollow tube having an inner diameter of from 0.1 to 5 mm as the porous membrane, a hollow fiber type anion exchange membrane can easily be obtained by coating the polysulfone anion exchange resin solution to the exterior or interior of the hollow fiber or tube to form a film. Such a hollow fiber module comprising an inner tube made of a hollow fiber and an outer tube enclosing the inner tube, is compact and easy for maintenance, and it is readily possible to obtain a module having pressure resistance and heat insurating properties, whereby it is particularly useful for applications where a liquid flows under high pressure during the treatment of a highly viscous solution, or where a heat resistance module is required against highly concentrated acid, particularly against the heat of dilution at the time of recovering highly concentrated sulfuric acid.

The second composite membrane is a laminated membrane comprising an anion exchanger layer having a thickness of from 1 to 100 μm and a porous supporting layer made of fiber having a porosity of from 10 to 90%, preferably from 20 to 70% and a thickness of from 10 to 200 μm, preferably from 30 to 150 μm.

Such a porous material includes a woven-fabric of monofilaments or multifilaments having a diameter of from 0.1 to 50 μm, such as plain weave, twill weave, satin weave or leno weave, and a non-woven fabric having a ratio of fiber length/fiber diameter of at least 10. It is particularly preferred to employ a non-woven fabric having a ratio of fiber length/fiber diameter of from 10 to $10^6$, preferably from $10^2$ to $10^5$, with the fiber diameter of from 0.1 to 50 μm, preferably from 1 to 20 μm, since it is thereby possible to readily attain the good adhesion with the anion exchanger layer.

As such a non-woven fabric, a non-woven fabric of polyvinylchloride, polyester, nylon, polyethylene, polypropylene, polyvinylidenefluoride or polytetrafluoroethylene, may be used. It is particularly preferred to employ a non-woven fabric made of polyethylene or polypropylene in view of the chemical resistance and availability of the material.

When an anion exchanger layer is embedded in the porous supporting layer, the resistance will be at least a few times the resistance of the anion exchanger layer. Therefore, it is preferred to conduct the lamination so that the porous supporting layer maintains a porosity of at least ½, preferably at least ¾ of pores.

As the above-mentioned adhesion method between the anion exchange layer and the porous film, there may be employed a method wherein the anion exchanger layer is laminated on the porous supporting layer in a softened state, for example, in a state containing from 30 to 70% by weight of a solvent, under a prescribed pressure for a prescribed time, or a method wherein an ion conductive polymer membrane is coated on the surface of the porous supporting layer and then the anion exchanger layer is formed. Further, a double layered laminate can be obtained without closing pores of the porous supporting layer by bonding the anion exchanger layer and the porous supporting layer with a solution, suspension or paste containing an ion conductive polymer, followed by drying for lamination. As the adhesives containing such an ion conductive polymer, a rayon viscous solution, a copper ammonia solution of cellulose, a polyvinylacetate solution or a polyvinylalcohol aqueous solution may be mentioned. Preferably, a solution of an ion exchange resin is used.

As such an ion exchange resin solution, the casting solution for the anion exchanger layer of the present invention may be employed as it is. Preferably, however, a casting solution for the anion exchanger layer is diluted before use to prevent the closure of the pores of the porous supporting layer. As the solvent for dilution, the same solvent as used for the casting solution may be used. However, in order to prevent dissolution of the cast anion exchanger layer, a poor solvent or a non-solvent to the polymer may be added. As such a diluting solvent for adhesion, water, an alcohol such as methanol or ethanol or an ether solvent such as tetrahydrofuran, may be mentioned.

Thus, after coating the adhesive agent, the anion exchanger layer and the porous supporting layer are overlayed to each other, followed by drying and heat treatment to obtain an anion exchange membrane reinforced by a laminated (double-layered) structure.

Another preferred anion exchange membrane made by using the anion exchanger of the present invention has a laminated structure comprising an ion conductive semi-permeable membrane containing no substantial ion exchange groups and an anion exchanger layer having an ion permselectivity.

As the ion conductive semi-permeable membrane containing no ion exchange groups constituting the present invention, a water-containing polymer membrane may be employed including a hydrated cellulose membrane represented by cellophane, a regenerated cellulose by a copper ammonia method such as cuprophane, a cellulose acetate membrane, a polyvinylalcohol membrane represented by vinylon and a poly(hydroxymethylene) membrane which is a hydrolized product of polyvinylcarbonate. Among them, a cellophane film or a vinylon film having a thickness of from 20 to 100 μm which is available in a large size inexpensively, is particularly preferred, since it is thereby possible to present the laminated membrane of the present invention in a large quantity to the market.

As opposed to the above-mentioned porous membrane, the semi-permeable membrane has substantially no pore, and a pinhole-free anion exchanger layer is formed on the semi-permeable membrane, whereby the anion exchanger layer can be made very thin, whereby it is possible to obtain a membrane having excellent permeability and high selectivity.

Thus, the above-mentioned polysulfone ion exchange resin is laminated on at least one side of the semi-permeable membrane of cellophane or vinylon film in a thickness of from 0.01 to 50 μm, preferably from 0.1 to 20 μm to obtain a laminated membrane of the present invention. The laminated membrane comprising the ion conductive semi-permeable membrane containing no ion exchange groups and a thin layer of the anion exchanger layer of the present invention thus obtained is expected to have excellent properties which can not be attained by a laminated membrane composed of conventional ion exchanger layers.

Namely, in the laminated anion exchange membrane of the present invention, the anion exchanger layer is extremely thin, whereby disadvantages of an ion exchanger such as an increase of resistance in a highly concentrated electrolyte solution, or an increase of resistance due to adsorption of fouling substance, hardly result.

Further, a large quantity of the laminated membrane can be supplied to the users at a low cost by using cellophane or vinylon as the neutral membrane. Therefore, it has a merit that it is useful also for applications where the conventional membranes can not be used because of the economical inefficiency.

The anion exchange membrane or laminated membrane thus obtained from the polysulfone block copolymer, is suitably treated with a solution such as an aqueous sodium chloride solution for hydration of the ion exchange groups, and then used as a membrane for electrodialysis, as a separator for electric cells, or as a separating membrane for e.g. diffusion dialysis.

In the case of diffusion dialysis, a solution containing an acid is brought in contact with one side of the anion exchange membrane and water is brought in contact in other side so that the acid is selectively diffused and dialyzed from the solution containing the acid to recover the acid.

In a case where a compound contained in the solution containing the acid is insoluble in water or is likely to be insoluble when hydrolized at a high pH, such as TiOSO$_4$, or Al(PO$_4$), it is sometimes preferred to contact a dilute acid (pH=not higher than 2) instead of water.

In the case of a process for recovering an acid, the present invention is useful also for applications which can not be attained by the conventional techniques, such as the recovery of an acid having a small permeation rate such as phosphoric acid from a solution containing it, such as recovery of phosphoric acid from the phosphoric acid etching waste solution from an aluminum plant, recovery of sulfuric acid from a process step for the production of titanium oxide by sulfuric acid method or recovery of sulfuric acid from a highly concentrated sulfuric acid waste solution having a large heat of dilution.

Now, the present invention will be described in further detail with reference to Examples. However, it should be understood that the present invention is by no means restricted by such specific Examples.

EXAMPLE 1

In the same manner as the synthesis disclosed in U.S. Pat. No. 4,654,410, 4,4'-diphenol and a dihalodiphenylsulfone were reacted to obtain a precursor of m=10 comprising aromatic polysulfone units. Then, the precursor, a dihalodiphenyl sulfone and sodiumsulfide were reacted to obtain an aromatic polysulfonepolythioethersulfone copolymer A of the formula:

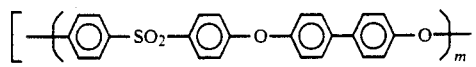

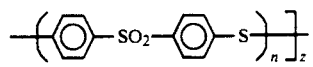

m/n=1/1, intrinsic viscosity: 0.65

Then, the copolymer A was dissolved in 1,1,2,2-tetrachloroethane, and then chloromethylmethylether and anhydrous stannic chloride were added thereto. The mixture was reacted at 110° C. for 4 hours, and the product was precipitated with methylalcohol and washed to obtain a chloromethylated copolymer B.

The copolymer B thus obtained, was dissolved in 1,1,2,2-tetrachloroethane to obtain a 10 wt. % solution. Then, the polymer solution was cast on a glass plate and heated and dried at 50° C. for two hours to obtain a cast membrane having a thickness of 25 μm.

Then, the cast membrane of the copolymer B was immersed in a 1.2N trimethylamine solution in a methanol-water mixture at 40° C. for 16 hours to obtain an anion exchange membrane.

The anion exchange membrane thus obtained had an ion exchange capacity of 2.2 meq/g dry resin, and it was immersed in a 0.5N NaCl aqueous solution, whereupon the alternate current resistance and the transport number of Cl ions by a membrane potential method were obtained.

Alternate current resistance (0.5N NaCl 1,000 Hz):

0.35Ω·cm$^2$

Cl$^-$transport number (0.5M NaCl/1M NaCl): 0.95

In one compartment of a dialytic cell divided into two compartments by the anion exchange membrane thus obtained, a solution containing 1 mol/l of sulfuric acid and 1 mol/l of zinc sulfate aqueous solution was filled, and in the other compartment, pure water was filled, whereupon the permeation rates of sulfuric acid and zinc sulfate permeating to the pure water side were measured. The results are shown in Table 1.

The ion exchange capacity of the anion exchange membrane was 2.2 meq/g dry resin, and the fixed ion concentration obtained from the amount of water absorbed in an equilibrium state by immersing the membrane in deionized water at 25° C. for 16 hours, was 6.0 meq/g water.

COMPARATIVE EXAMPLES 1-(1) TO 1-(4)

In each of four types of monomer mixture solutions having different compositions of chloromethylstyrene-divinylbenzene and styrene monomer, 5% by weight of nitrile rubber was dissolved, and benzoylperoxide was further dissolved as a polymerization initiator to obtain a monomer syrup. This monomer syrup was coated on a polyvinylchloride cloth, sandwiched between Mylar films and polymerized. The polymerized membrane thus obtained was aminated in a trimethylamine solution to obtain an anion exchange membrane having a thickness of 120 μm. The anion exchange membrane thus obtained was tested in the same manner as in Example 1 to determine the permiation rates of sulfuric acid and zinc sulfate, the ion exchange capacity and the fixed ion concentration. The results are shown in Table 1.

TABLE 1

| | Ion exchange capacity (meq/g dry resin) | Fixed ion concentration (meq/g $H_2O$) | Permeation rate of sulfuric acid (mol/m$^2$ · hr · ΔC.) | Permeation rate of zinc sulfate (mol/m$^2$ · hr · ΔC.) | Permselectivity* |
|---|---|---|---|---|---|
| Example 1 | 2.2 | 6.0 | 8.0 | 0.008 | 1000 |
| Comparative Example | | | | | |
| 1-(1) | 1.9 | 10 | 1.8 | 0.001 | 1250 |
| 1-(2) | 2.1 | 6.1 | 2.7 | 0.005 | 520 |
| 1-(3) | 2.0 | 5.4 | 4.1 | 0.022 | 190 |
| 1-(4) | 2.2 | 3.5 | 5.0 | 0.10 | 50 |

*Permselectivity = $\frac{\text{Permeation rate of sulfuric acid}}{\text{Permeation rate of zinc sulfate}}$

EXAMPLE 2

The chloromethylated copolymer B obtained in Example 1 was dissolved in N,N-dimethylformamide to obtain a 10 wt. % solution. Then, to this solution, a 1.2N trimethylamine solution in N,N-dimethylformamide was added to obtain polymer solution having the different amino group concentration. The aminated polymer solution thus obtained was cast on a glass plate and dried at 50° C. for two hours to obtain an anion exchange membrane having a thickness of 25 μm and having the ion exchange capacity and the fixed ion concentration varied. The electric resistance and the transport number are shown in Table 2.

The anion exchange membrane was tested for diffusion dialytic performance of a solution containing 2 mol/l of phosphoric acid and 0.5 mol/l of aluminum phosphate. The results are shown in Table 3.

TABLE 2

| Example | Amount of trimethylamine TMA (meq)/g copolymer B | 25 μm thick Alternate current resistance (Ω · cm$^2$) | Cl$^-$ Transport number |
|---|---|---|---|
| 2-(1) | 0.5 | 5000 | 0.98 |
| 2-(2) | 1.0 | 10 | 0.97 |
| 2-(3) | 1.5 | 1.5 | 0.96 |
| 2-(4) | 2.0 | 0.5 | 0.95 |
| 2-(5) | 2.5 | 0.37 | 0.94 |
| 2-(6) | 3.0 | 0.20 | 0.91 |

TABLE 3

| Example | Ion exchange capacity (meq/g dry resin) | Fixed ion concentration (meq/g $H_2O$) | Permeation rate of phosphoric acid (mol/m$^2$ · hr · ΔC.) | Permselectivity* |
|---|---|---|---|---|
| 2-(3) | 1.1 | 20 | 0.7 | 500 |
| 2-(4) | 1.9 | 10.0 | 2.0 | 70 |
| 2-(5) | 2.2 | 8.9 | 3.0 | 40 |
| 2-(6) | 2.2 | 4.3 | 5.0 | 10 |
| Comparative Example 1-(3) | 2.0 | 5.4 | 0.7 | 50 |

*Permselectivity = $\frac{\text{Permeation rate of phosphoric acid}}{\text{Permeation rate of aluminum phosphate}}$

EXAMPLE 3

The copolymer B obtained in Example 1 was dissolved in N,N-dimethylformamide to obtain a 10 wt. % solution. Then, to this solution, a predetermined amount of a 1.2N trimethylamine solution in N,N-dimethylformamide was added to obtain a solution of a quaternary aminated polymer C having an ion exchange capacity of 2.0 meq/g dry resin.

On the other hand, ethylalcohol was impregnated to a polypropylene porous membrane having a pore diameter of 0.04 μm, a porosity of 45% and a thickness of 25 μm, followed by dipping in water. Further, it was immersed in an aqueous solution containing 1% by weight of sodium isopropylnaphthalenesulfate at room temperature for three minutes, and then dried at 60° C. for 10 minutes to obtain an anion surfactant-impregnated porous membrane. This membrane was immersed in a 0.5 wt. % poly(2-hydroxy-3-dimethylaminopropylchloride) aqueous solution at room temperature for one minute, and dried at 60° C. for 10 minutes to obtain a hydrophilic polypropylene porous membrane.

The above-mentioned quaternary aminated polymer C solution in N,N-dimethylformamide, was coated on the hydrophilic polypropylene porous membrane and dried at 50° C. for two hours to obtain a laminated ion exchange membrane having the ion exchange membrane layer thickness of 10 μm. The effective electric resistance values of the ion exchange membrane in a 0.5N NaCl aqueous solution and a 0.5M $H_2SO_4$ aqueous solution were 0.8Ω·cm$^2$ and 0.39 Ω·cm$^2$, respectively.

The laminated membrane thus obtained was installed in a cell for a small batch-type acid diffusion dialysis, and sulfuric acid and a $ZnSO_4$ aqueous solution having predetermined concentrations were put in one side, and deionized water was put in the other side, whereupon the static permeation rate and the selectivity of sulfuric acid were evaluated from the sulfuric acid concentration and the Zn ion concentration in the deionized water side upon expiration of 1 hour. The results are shown in Table 4.

TABLE 4

| Concentrations supplied solutions | | | Comparative Example |
|---|---|---|---|
| $H_2SO_4$(M) | $ZnSO_4$(M) | Example 3 | 1-(3) |
| 1.0 | 1.0 | $UH_2SO_4$* 7.0 | 4.1 |
| | | $UZnSO_4$* 2.0 × 10$^{-2}$ | 2.2 × 10$^{-2}$ |
| | | $R_s$** 3.0 × 10$^{-3}$ | 5.3 × 10$^{-3}$ |
| 2.0 | 1.0 | $UH_2SO_4$* 6.7 | 3.3 |
| | | $UZnSO_4$* 2.3 × 10$^{-2}$ | 2.1 × 10$^{-2}$ |
| | | $R_s$** 3.4 × 10$^{-3}$ | 6.4 × 10$^{-3}$ |
| 6.0 | 0.1 | $UH_2SO_4$* 5.2 | 2.2 |
| | | $UZnSO_4$* 1.9 × 10$^{-2}$ | 9.3 × 10$^{-1}$ |
| | | $R_s$** 3.6 × 10$^{-3}$ | 4.3 × 10$^{-3}$ |
| 10.0 | 0.1 | $UH_2SO_4$* 3.9 | 1.6 |
| | | $UZnSO_4$* 5.6 × 10$^{-3}$ | 1.1 × 10$^{-2}$ |
| | | $R_s$** 1.4 × 10$^{-3}$ | 6.8 × 10$^{-3}$ |
| 14.0 | 0.01 | $UH_2SO_4$* 4.4 | 1.5 |
| | | $UZnSO_4$* — | 4.9 × 10$^{-2}$ |
| | | $R_s$** — | 3.2 × 10$^{-2}$ |

*Unit: mol/m$^2$ · hr · ΔC
**$R_s$: $UZn/UH_2SO_4$

EXAMPLE 4

A polypropylene hollow fiber porous membrane having an outer diameter of 250 μm, an inner diameter of 200 μm, a pore diameter of 0.02 μm, a porosity of 45% and a thickness of 25 μm was subjected to the hydrophilic treatment in the same manner as in Example 1. On the hydrophilic hollow porous membrane thus obtained, the quaternary aminated polymer solution obtained in the same manner as in Example 1 was coated and dried to obtain a laminated hollow fiber membrane having a coating layer thickness of 10 μm. 1,000 such hollow fibers having a length of 60 cm were bundled and secured at both ends to a separator made of heat resistant polyvinylchloride by means of an epoxy resin to obtain an acid recovery module as shown in FIG. 1.

To the inside of the hollow fibers of such an acid recovery apparatus, an acid solution containing 10M sulfuric acid and 0.1M of zinc sulfate was supplied from bottom at a rate of 0.5 l/min. On the other hand, pure water was supplied to the outside of the hollow fibers from the top at a rate of 0.5 l/min, whereby a solution containing 7.5M of sulfuric acid and 0.001 mol/l of zinc sulfate was obtained. The recovery rate of sulfuric acid was 80%.

EXAMPLE 5-(1)

The copolymer B of Example 1 was dissolved in N,N-dimethylformamide, and then trimethylamine was added in an amount of 1.8 meq/g of the chloromethylated copolymer B to obtain a solution containing 10% by weight of an aminated copolymer having an ion exchange capacity of 1.63 meq/g dry resin.

The aminated copolymer solution thus obtained was cast on a Mylar film and heated and dried at 110° C. for 30 minutes to obtain an anion exchange layer having a thickness of 25 μm.

Then, methanol was added to the aminated copolymer solution for casting to obtain a 2 wt. % solution. This solution was coated in a thickness of 20 μm on the anion exchange layer having a thickness of 25 μm. Then, a polypropylene non-woven fabric having a fiber diameter of 10 μm, an average fiber length of 30 mm, a density of 35 g/m² and a thickness of 80 μm, was overlayed and dried at 110° C. for 30 minutes. Then, the product was released from the Mylar film to obtain a laminated ion exchange membrane. An aqueous solution containing 3M of sulfuric acid and 0.7M of ferrous sulfate was contacted on the ion exchanger layer side of the ion exchange membrane thus obtained, and deionized water was contacted to the other side of the membrane to determine the permeation constants of sulfuric acid and $Fe^{2+}$ ions transferred to the deionized water side and the selectivity. The permeation rate of sulfuric acid was 5 mol/m²·hr·ΔC, and the ratio of the permeation rate of sulfuric acid to the permeation rate of ferrous sulfate was 1,000.

The resistance of the membrane in 0.5N NaCl was 1.0 Ω·cm².

EXAMPLE 5-(2)

A laminated ion exchange membrane was prepared in the same manner as in Example 5-(1) except that in Example 5-(1), 2.5 meq of trimethylamine was added per gram of the chloromethylated copolymer B, and a solution containing 10% by weight of an aminated copolymer having an ion exchange capacity of 2.2 meq/g dry resin was used.

The ion exchange membrane thus obtained had a resistance of 0.6Ω·cm² in 0.5N NaCl, and the permeation rate of sulfuric acid was 10 mol/m²·hr·ΔC, and the ratio of the permeation rate of sulfuric acid to the permeation rate of ferrous sulfate was 100.

EXAMPLE 6

The copolymer B obtained in Example 1 was dissolved in N,N-dimethylformamide, and trimethylamine was added in an amount of 2.0 meq/g of the chloromethylated copolymer B to obtain an aminated copolymer solution. The aminated copolymer solution thus obtained was cast on a cellophane film having a thickness of 50 μm and heated and dried at 50° C. for two hours. In this manner, five types of double layered membranes differing in the thickness of the ion exchanger layer were prepared.

With respect to each composite membrane, the alternate current resistance in 0.5M NaCl and the transport number of $Cl^-$ ions obtained from the membrane potential in 0.5M NaCl and 1.0M NaCl are shown in Table 5. The ion exchange capacity of the anion exchange membrane obtained by casting the aminated copolymer solution on a glass plate was 1.8 meq/g dry resin.

To one compartment on the ion exchanger layer side of a dialytic cell divided into two compartments by the anion exchange membrane thus obtained, a solution containing 1 mol/l of sulfuric acid and 1 mol/l of zinc sulfate was filled, and to the other compartment on the cellophane film side, pure water was filled, whereby the permeation rates of sulfuric acid and zinc sulfate permeating to the pure water side were obtained. The results are shown in Table 6.

TABLE 5

|  | Thickness of anion exchanger (μm) | Resistance in 0.5N NaCl (Ω · cm²) | Transport number of $Cl^-$ |
|---|---|---|---|
| Example |  |  |  |
| 6-(1) | 10 | 1.42 | 0.95 |
| 6-(2) | 5 | 1.22 | 0.93 |
| 6-(3) | 2.5 | 1.07 | 0.90 |
| 6-(4) | 1 | 1.01 | 0.84 |
| 6-(5) | 0.5 | 1.00 | 0.82 |
| Comparative Example | Nil | 1.0 | 0.62 |

TABLE 6

|  | Thickness of anion exchanger (μm) | Permeation rate of acid (mol/m² · hr · ΔC.) | Permselectivity* |
|---|---|---|---|
| Example |  |  |  |
| 6-(1) | 10 | 4.1 | 1700 |
| 6-(2) | 5 | 4.6 | 1250 |
| 6-(3) | 2.5 | 4.8 | 1000 |
| 6-(4) | 1 | 4.9 | 330 |
| 6-(5) | 0.5 | 5.0 | 170 |
| Comparative Example | Nil | 6.1 | 12 |

*Permselectivity = $\frac{\text{Permeation rate of acid}}{\text{Permeation rate of zinc}}$

EXAMPLE 7

The copolymer B obtained in Example 1 was dissolved in 1,1,2,2-tetrachloroethane to obtain a 10 wt. % solution. Then, the polymer solution was cast on a glass plate and heated and dried at 50° C. for two hours to obtain a cast membrane having a thickness of 25 μm.

Then, the cast membrane of the copolymer B was immersed in a solution containing 1.2M of N,N,N',N'-tetramethyl-1,3-diaminopropane in a methanoldimethylsulfoxide mixture at 40° C. for 16 hours to obtain an anion exchange membrane. The anion exchange membrane thus obtained had an ion exchange capacity of 2.6 meq/g dry resin, and it was immersed in a 0.5N N:.Cl aqueous solution, whereupon the alternate current resistance and the transport number of Cl⁻ ions by a membrane potential method were obtained.

Alternate current resistance (0.5N NaCl 1,000 Hz):

0.5Ω·cm²

Cl⁻ transport number (0.5M NaCl/1.0M NaCl membrane potential): 0.97

The anion exchange membrane thus obtained was immersed in dimethylsulfoxide and N,N-dimethylformamide, but it did not dissolve in either solvent.

EXAMPLE 8

The chloromethylation reaction in Example 1 was conducted at 60° C. for 4 hours to obtain a chloromethylated copolymer C. In the same manner as in Example 1, the copolymer C was dissolved in 1,1,2,2-tetrachloroethane, and the solution was cast on a glass plate and dried to obtain a copolymer C membrane having a thickness of 25 μm. The copolymer C membrane was aminated in the same manner as in Example 1 to obtain an anion exchange membrane. The ion exchange capacity was 1.5 meq/g dry resin, the alternate current resistance was 0.8Ω·cm², and Cl⁻ transport number was 0.96.

With respect to the polymer D, the chloromethylated polymer membrane was immersed in an amination solution, the membrane swelled like jelly, whereby no anionic membrane was obtained.

On the other hand, with respect to the polymer E, after the amination treatment, the membrane resistance was measured and found to be at least 1,000KΩ·cm².

EXAMPLE 9

The chloromethylated copolymer B obtained in Example 1 was dissolved in N,N-dimethylformamide to obtain a 10 wt. % solution. Then, to this solution, a predetermined amount of a 1.2N trimethylamine solution in N,N-dimethylformamide was added to obtain five kinds of aminated polymer solutions having ion exchange capacities of 0.8 meq/g dry resin, 1.2 meq/g dry resin, 1.6 meq/g dry resin, 2.0 meq/g dry resin and 2.2 meq/g dry resin, respectively.

Each of such aminated polymer solutions was cast on a glass plate and dried at 50° C. for two hours to obtain an anion exchanger layer having a thickness of 5 μm and having a different ion exchange capacity. Then, on the anion exchanger layer having a thickness of 5 μm, a solution of an aminated polymer having an ion exchange capacity of 2.2 meq/g dry resin was cast and dried at 50° C. for two hours to laminate an ion exchanger layer having a thickness of 20 μm and having an ion exchange capacity of 2.2 meq/g dry resin.

Then, a solution containing 3M sulfuric acid and 0.7M ferrous sulfate was filled in the lower ion exchange capacity side of the laminated membrane having different ion exchange capacities, and pure water was filled in the other compartment, whereupon the diffusion type dialytic performance was obtained. The results are shown in Table 7.

TABLE 7

| | First layer | | Second layer | | | |
|---|---|---|---|---|---|---|
| | Ion exchange capacity | Thickness | Ion exchange capacity | Thickness | Permeation rate of acid (mol/m²·hr·ΔC.) | Permselectivity* |
| Example | | | | | | |
| 7-(1) | 2.2 | 5 μm | 2.2 | 20 μm | 10 | 100 |
| 7-(2) | 2.0 | 5 μm | 2.2 | 20 μm | 9.5 | 120 |
| 7-(3) | 1.6 | 5 μm | 2.2 | 20 μm | 8.5 | 200 |
| 7-(4) | 1.2 | 5 μm | 2.2 | 20 μm | 5 | 5000 |
| 7-(5) | 0.8 | 5 μm | 2.2 | 20 μm | 0.4 | 1000 |

*Permselectivity = Permeation rate of acid / Permeation rate of iron

COMPARATIVE EXAMPLE 2

A membrane was prepared in the same manner as in Example 1 except that instead of the copolymer A, a homopolymer of polysulfone polymer D and a homopolymer of polymer E were used.

Polymer D:

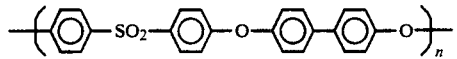

Intrinsic viscosity: 0.6

Polymer E:

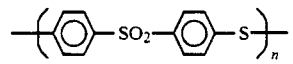

Intrinsic viscosity: 0.4

What is claimed:

1. An anion exchanger consisting essentially of an aromatic polysulfone block copolymer of the formula:

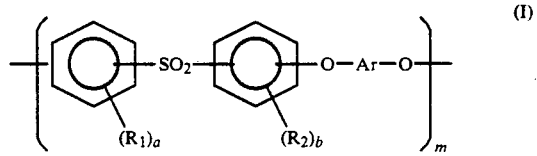

(I)

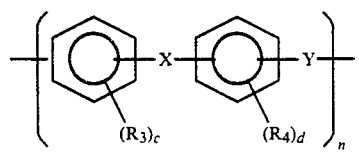

wherein Ar is

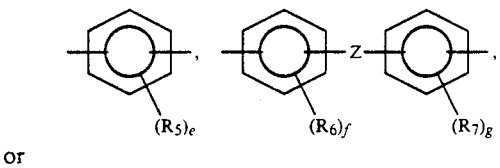

or

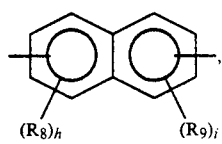

X is —SO$_2$,

—S— or —O— Y is —SO$_2$—, —S— or —O—, Z is a single bond, —O—, —S—, —SO$_2$,

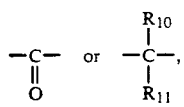

each of R$_1$ to R$_9$ which may be the or different is a hydrocarbon group having from 1 to 8 carbon atoms, each of a to d is an integer of from 0 to 4, e is an integer of from 0 to 3, (f+g) is from 0 to 7, (h+i) is from 0 to 5, each of R$_{10}$ R$_{11}$ is a hydrogen atom or a hydrocarbon group having from 1 to 6 carbon atoms, and each of m and n is an integer of from 2 to 200, provided m/n=100/1-1/10, and said block copolymer having anion exchange groups introduced thereto on the aromatic rings of the copolymer.

2. The anion exchanger according to claim 1, wherein the anion exchange groups are introduced into the copolymer by chloromethylation which forms chloromethyl groups within the copolymer, and then the chloromethyl groups are aminated.

3. The anion exchanger according to claim 1, wherein said block copolymer has an intrinsic viscosity of at least 0.3.

4. The anion exchanger according to claim 1, which is an anion exchange membrane having an ion exchange capacity of from 0.5 to 4.5 meq/g dry resin and a thickness of from 0.01 to 100 μm, wherein the ion exchange groups are selected from the group consisting of primary to tertiary amines and quaternary ammonium salts.

5. The anion exchanger according to claim 1, which is an anion exchange membrane obtained by casting a solution of a chloromethylated polysulfone block copolymer, followed by heat treatment to form a membrane having a thickness of at most 100 μm, which is then aminated with at least one primary to tertiary amine.

6. The anion exchanger according to claim 1, which is an anion exchange membrane having a thickness of at most 100 μm obtained by casting a solution of an aminated polysulfone copolymer obtained by adding at least one primary to tertiary amine to a solution of a chloromethylated polysulfone block copolymer, followed by heat treatment.

7. The anion exchange membrane according to claim 1, which is a cross-linked product of a chloromethylated aromatic polysulfone polymer with a polyamine.

8. The anion exchange membrane according to claim 7, wherein the polyamine is represented by the formula:

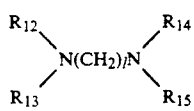

wherein each of R$_{12}$ to R$_5$ which may be the same or different is hydrogen or a hydrocarbon having from 1 to 5 carbon atoms, and l is an integer of from 1 to 10.

9. The anion exchanger according to claim 1, which is prepared by heating and cross-linking an aromatic polysulfone copolymer containing chloromethyl groups in the presence of a Friedel-Craft catalyst.

10. The anion exchanger according to claim 7, which is not soluble in N,N-dimethylformamide or dimethylsulfoxide.

11. The anion exchanger according to claim 1, which is an anion exchange membrane comprising at least two layers having different fixed ion concentrations.

12. The anion exchanger according to claim 11 wherein the component of the different fixed ion concentrations between said at least two layers is comprised by the different ion exchange capacities which is at least 0.2 meq/g dry resin, and the thickness of the layer having a smaller ion exchange capacity is at most ½ of the total thickness of the membrane.

13. The anion exchanger according to claim 1, which is an anion exchange membrane having combined therewith a polyhydrocarbonolefin or polyfluoroolefin porous membrane having a pore size of from 0.01 to 5 μm, a porosity of from 30 to 90% and a thickness of from 10 to 200 μm with its wall being hydrophilic.

14. The anion exchanger according to claim 13, the thickness of the ion exchange membrane having anion exchange groups is from 0.1 to 50 μm.

15. The anion exchanger according to claim 13, wherein the hydrophilicity of the porous membrane has been imparted by impregnating an ionic surfactant, followed by treatment with a polymer with a main chain having a reverse electric charge.

16. The anion exchanger according to claim 13, which is a hollow fiber ion exchange membrane, wherein the porous membrane is a hollow fiber having an inner diameter of from 0.1 to 2 mm.

17. The anion exchanger according to claim 1, which is an anion exchange membrane having laminated therewith a porous supporting layer made of fiber and having a porosity of from 10 to 80% and a thickness of from 10 to 200 μm.

18. The anion exchanger according to claim 17, wherein the porous supporting layer is made of a nonwoven fabric having a fiber diameter of from 0.1 to 50 μm and a fiber length/fiber diameter ratio of at least 10.

19. The anion exchanger according to claim 17, wherein the anion exchanger layer and the porous supporting layer are bonded by an adhesive which is a solution of a polymer having ion exchange groups.

20. The anion exchanger according to claim 25, which is a double-layered membrane comprising an ion conductive semi-permeable membrane having no substantial ion exchange groups and an anion exchanger layer thinner than the semi permeable membrane.

21. The anion exchanger according to claim 20, wherein the anion exchanger layer has an ion exchange capacity of from 0.5 to 3.5 meq/g dry resin and a thickness of from 0.01 to 50 μm.

22. The anion exchanger according to claim 20, wherein the semi-permeable membrane is a cellophane or vinylon film having a thickness of from 10 to 100 μm.

23. The anion exchanger according to claim 1, which is an anion exchange membrane useful for selectively diffusing and dialysing an acid from a solution containing the acid.

24. The anion exchanger according to claim 1, wherein the aromatic polysulfone block copolymer has the formula:

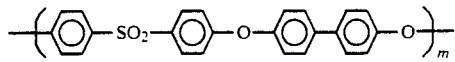

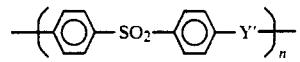

wherein Y' is —S— or —O—, m/n=100/1–1/10.

25. The anion exchanger according to claim 1, wherein the aromatic polysulfone block copolymer has the formula:

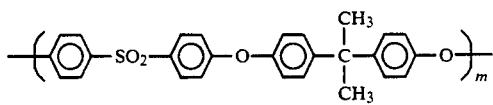

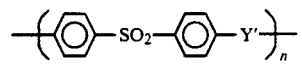

wherein Y' is —S—, or —O—, m/n=100/1–1/10.

* * * * *